Jan. 27, 1953 C. E. FORSYTHE 2,626,511
FLEXIBLE COUPLING
Filed Sept. 26, 1950 2 SHEETS—SHEET 1
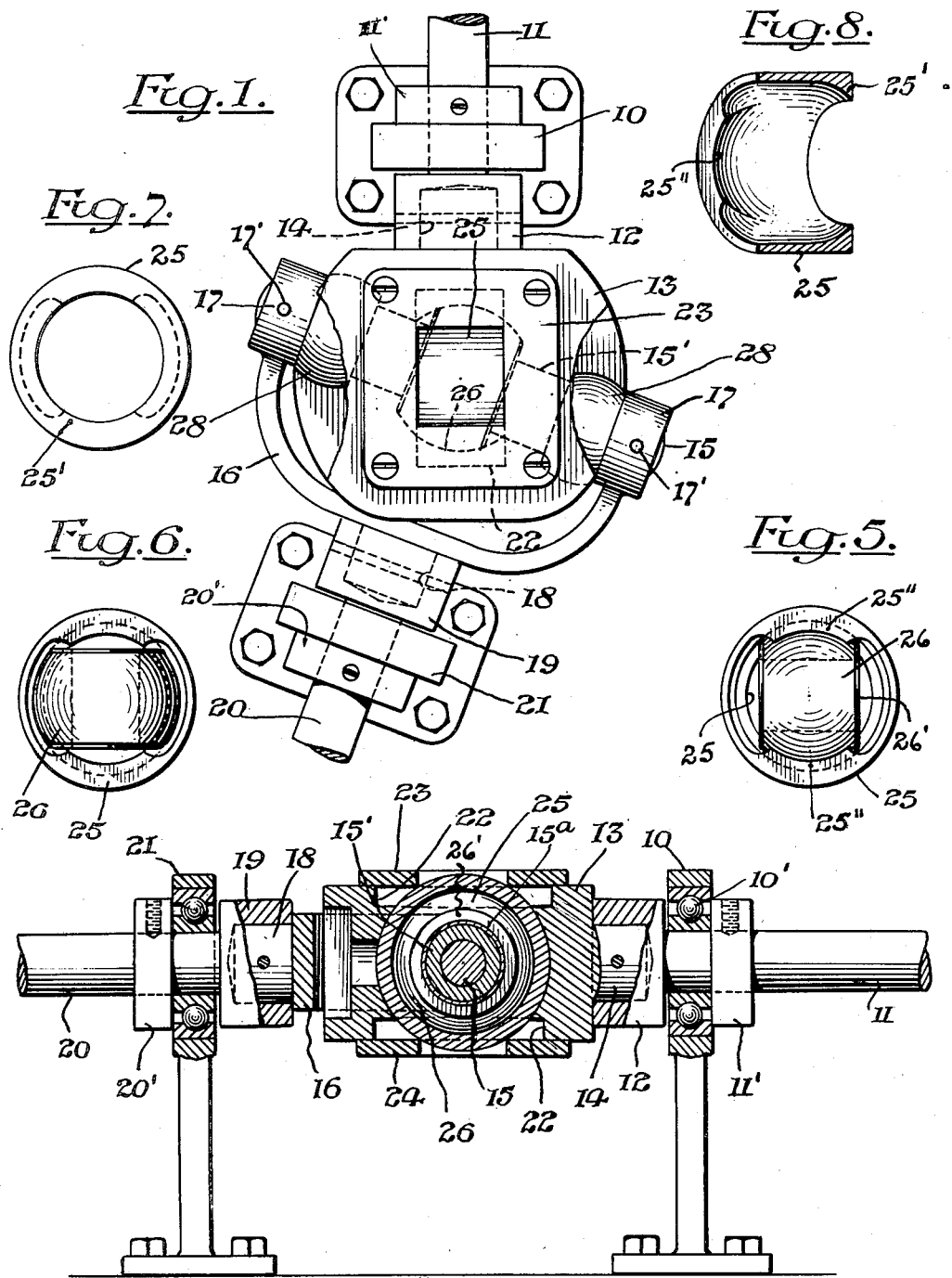
INVENTOR
Charles E. Forsythe
BY Darby & Darby
ATTORNEYS.

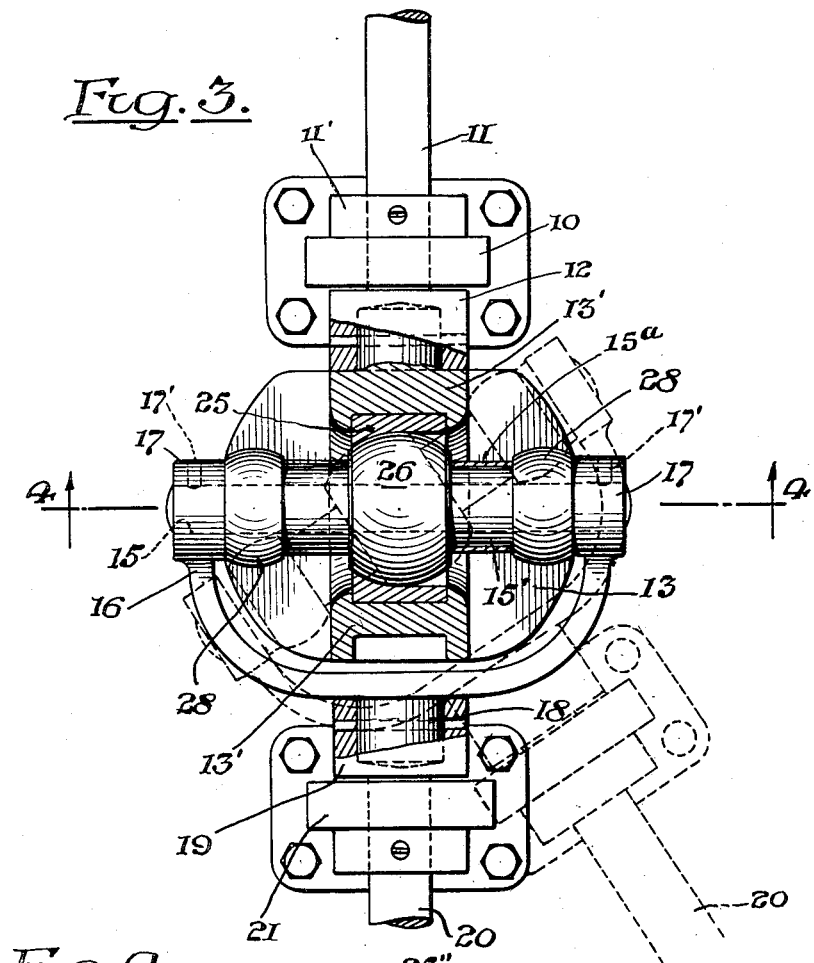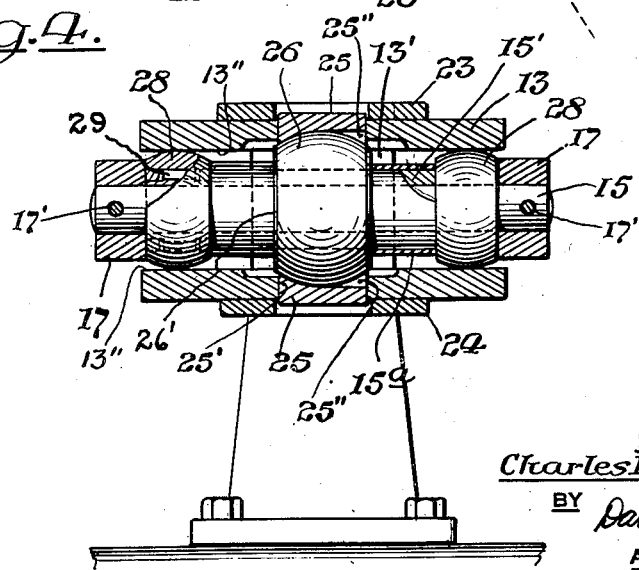

Patented Jan. 27, 1953

2,626,511

UNITED STATES PATENT OFFICE 2,626,511

FLEXIBLE COUPLING

Charles E. Forsythe, Stony Brook, N. Y.

Application September 26, 1950, Serial No. 186,879

10 Claims. (Cl. 64—7)

This invention relates to improvements in flexible couplings and universal joints for transmitting rotary power.

The main object of this invention is to provide a form of construction for flexible couplings and universal joints capable of transmitting rotary power at substantially greater angles with respect to the drive shaft than has heretofore been possible.

Another object of the invention is to provide a universal power transmitting coupling permitting substantially greater angular movement of the driven shaft with respect to the drive shaft than has heretofore been possible with devices of this type.

Other and more detailed objects of the invention will be apparent from the following description of the embodiment of the invention illustrated in the attached drawings.

In the accompanying drawings,

Figure 1 is a plan view of a coupling in accordance with this invention;

Figure 2 is a longitudinal, central, cross-sectional view through the driving and driven shafts showing the coupling structure with a few parts in elevation;

Figure 3 is a top plan view of the coupling with some parts broken away;

Figure 4 is a cross-sectional view taken on the line 4—4 of Figure 3;

Figure 5 is an elevational view of the ring 25 showing the spherical bearing member in place;

Figure 6 is a similar view showing the spherical bearing member 26 rotated for removal from the ring;

Figure 7 is a side elevational view of the ring from the fully flanged side; and Figure 8 is a vertical, central, cross-sectional view in perspective looking into the ring.

This invention has for its object improved flexible couplings and universal joints to permit a much greater range of relative movement between the driven and the driving shafts than has heretofore been possible with conventional devices of this type. The structure which makes this improvement possible is also inherently stronger by reason of the construction employed so that the device has a normally longer life than is common with devices of this kind.

The coupling has been illustrated in the drawings providing a driving connection between a driving and a driven shaft, each respectively mounted in fixed bearings but, as will appear from the following description, it is not necessary that both these shafts be mounted in fixed bearings. The driving shaft 11, driven from any suitable source of power, is illustrated as mounted in a fixed bearing housing 10 in which is supported an anti-friction bearing 10', Fig. 2. As shown, the shaft 11 is provided with an enlarged recessed head 12 at its end, having a driving connection with a stub 14, forming part of a yoke 13. A collar 11' secured to the shaft 11 restricts its longitudinal movement in the anti-friction bearing. Stub 14 may be secured to the end 12 of the shaft in any suitable manner as by means of a set screw, key or other form of lock.

The yoke 13 consists of a pair of parallel spaced plates having arcuate ends and flat sides 13". These plates are connected by a pair of diametrically arranged webs 13', see Figure 3, which are at the flat sides of the plates and are integral with them. The central portions of the plates are cut out in the form of rectangular openings 22 which are closed by cover plates 23 and 24 attached to opposite sides of the yokes by means of machine screws, as shown. These cover plates in turn have rectangular openings of smaller size through which the diametrically opposed portions of a ring 25 project, and for which they form a positioning means. This ring has a continuous flange 25' at one side, as shown in Figure 7, but is discontinuous at diametrically arranged portions 25" as indicated in Figure 5. The inner surface of the ring is spherical to provide a seat for a spherical ball 26 which is flattened at its sides. It will be seen by reference to Figure 6, that by turning the ball 26 on its center, it can be turned to a position for removal from the ring 25 which forms a race for the ball. This ball has an anti-friction bearing in a central aperture extending perpendicularly to the flat side into which a shouldered sleeve 15' may be slid from one end. The lefthand end of sleeve 15', Figure 4, is of larger diameter than the remainder to form a shoulder against which the bearing member 26' of the ball 26 rests at its left side. A shaft 15 lies in the bore of sleeve 15'.

Anti-friction bearing members 29 adjacent the ends of sleeve 15' are mounted on shaft 15. The outer race of each bearing 29 comprises a spherical bearing member 28, which are likewise flattened on their sides, as in the case of member 26. The spherical members 28 are dimensioned so as to have a rolling line contact with the inner opposed faces of the plates forming the sides of the yoke 13. The ends of shaft 15 lie in bores in the hubs 17 at the end of a U-shaped yoke 16 and are secured by set screws 17'. It is desirable to provide a spacing sleeve 15ª for the area of sleeve 15' between the bearing 28 and the ball 26. The yoke 16 is provided with a stub 18 which is secured in a recess in the enlarged end 19 of the driven shaft 20. As in the case of the driving shaft, shaft 20 is mounted in anti-friction bearings in a bearing housing 21, and is provided with a collar 20' to prevent actual movement. The connection between shaft 20 and yoke 16 includes some form of locking means such as a set screw, key or the like, for securing them together for conjoint rotation.

It is not absolutely essential that the cover plates 23 and 24 be used, since as will be apparent, the seat in the yoke 13 for the ring race 25 could be formed to provide a snug fit therewith. In the form shown, a snug fit seat for the ring 25 is provided by the cover plates 23 and 24. Thus, they provide a refinement which is not absolutely necessary, since the ring could be directly mounted in a close fitting seat formed in the yoke 13.

The ring race 25 can be mounted in the yoke 13 by removing one of the plates 23 or 24. The rectangular openings in these plates form a snug fit with the ring 25 at its sides and periphery, as is clear from Figures 1 and 2. The coupling is assembled by placing the spherical member 26 in the ring 25 as explained. Sleeve 15' is inserted in the bore of the sphere 26 and shaft 15 is slid endwise through the hubs 17 of yoke 16, but before shaft 15 is thus slid into place, the spherical bearing members 28 with their anti-friction bearings 29 are positioned so that the shaft will pass first through one of them, then through the sleeve 15', and then through the other. It is then locked in hubs 17 by means of the set screws 17'. The ends of the sleeve 15' contact the inner faces of the anti-friction bearing members 29 and their opposite faces engage the hubs 17.

When the driven shaft 20 is to remain in the plane of shaft 11 it may be used with the bearing 21 and may be placed at an angle with the axis of shaft 11 up to 35 degrees, as indicated in Figure 3. The limit of the angular position in this respect is determined by the width of the webs 13' of the yoke, see Figure 3. Since shaft 15 is fixed to yoke 16, it can be given various positions in a vertical plane with respect to the plane of shaft 11, and thus for some applications fixed bearing 21 is eliminated. In this case the coupling axis of the universal joint is capable of rotation about two axes at right angles to each other.

It will be apparent from the construction illustrated that the coupling has considerable strength represented by the leverage arms provided by the shaft 15, extending at right angles to and beyond the faces of the spherical member 26.

Thus it will be seen that the driven shaft may be angularly positioned in the plane of the driving shaft anywhere within a maximum angle of about 70 degrees in cases where the driven shaft is mounted in a fixed bearing. However, if the driven shaft is not mounted in the fixed bearing it may have movement in any plane, thus providing a universal joint action capable of wide angular movements both in a horizontal plane containing the driving shaft, as well as in any vertical plane at right angles thereto. In other words, the driven shaft will move through conical paths having angles at the apex from 0° to 70°. It will be understood that the various details of construction employed may be varied without departure from the novel subject matter herein disclosed. For example, the driving shaft 11 may be made integral with the yoke 13 for some uses and the driven shaft 20 may be made integral with the yoke 16. I prefer, therefore, to be limited only as required by the appended claims. As is well understood in this art, a flexible coupling as disclosed is capable of being driven from either end. Thus the designation of shaft 11 as a driving shaft and shaft 20 as the driven shaft is for convenience only, since obviously shaft 20 could be the driving shaft and shaft 11 the driven shaft. It will be understood, therefore, that it is intended that the language of the claims in this respect is not used in a limiting sense, but for the purpose of simplification, since the driving shaft of the claims could be the driven shaft and the driven shaft could be the driving shaft.

What is claimed is:

1. A flexible coupling as disclosed, comprising a driving shaft, a driven shaft, a driving yoke connected to said driving shaft having a pair of opposed bearing surfaces, a driven yoke connected to the driven shaft, a transverse shaft mounted in said driven yoke, bearing members on said transverse shaft and engaging said bearing surfaces, a ring having a spherical seat mounted in said driving yoke, and a spherical bearing member lying in said ring and mounted on said transverse shaft.

2. In the combination of claim 1, said bearing members on said transverse shaft being spherical.

3. In the combination of claim 1, said bearing members on said transverse shaft being spherical, and anti-fraction bearings interposed between said bearing members and said shaft.

4. In the combination of claim 1, said spherical bearing member having flattened sides and the spherical seat of said ring being cut away at diametrically opposed portions whereby said spherical bearing member can be removed from said ring.

5. A flexible coupling of the type described comprising a driving shaft having a driving yoke, a driven shaft having a driven yoke, said driving yoke comprising a pair of plates forming opposed bearing surfaces, a transverse shaft mounted in said driven yoke, bearing members on said transverse shaft engaging said bearing surfaces, and means including a race member mounted in said driving yoke and a cooperating member on said transverse shaft to permit rotation of said transverse shaft in two planes at right angles to each other.

6. A flexible coupling of the type described comprising a driving shaft having a driving yoke, a driven shaft having a driven yoke, said driving yoke having a pair of spaced parallel bearing surfaces, a transverse shaft mounted in said driven yoke, rotatable bearing members on said transverse shaft and lying between said bearing surfaces, and means comprising a spherical race member and a cooperating spherical ball member for connecting said yokes together.

7. In the combination of claim 6, said spherical race member being mounted on said driving yoke and said ball member on said transverse shaft.

8. In the combination of claim 6, said spherical race member being a detachable ring, and means for securing said ring to said driving yoke.

9. In the combination of claim 6, said race member comprising a ring having diametrically arranged peripherial openings to permit removal of said spherical ball member.

10. In the combination of claim 6, said driving yoke having a pair of aligned openings and said spherical race member being mounted in said openings.

CHARLES E. FORSYTHE.

REFERENCES CITED

The following references are of record in the file of this patent:

UNITED STATES PATENTS

| Number | Name | Date |
| --- | --- | --- |
| 2,207,981 | Greiner | July 16, 1940 |